able pipe calking compound, or it may be a curable substance, such as a polyurethane, sprayed onto the appropriate surfaces of the pipe ends. If a flexible polyurethane foam is used, it will bond to the pipe surface when applied, but once cured, will not form a bond with the mating end of another pipe. A sealing material is most effective on the interior surface of the female end of the pipe if it is applied to that portion of the interior surface which is innermost with respect to the central portion of the pipe, that is, to that portion of the female end of the pipe most closely adjacent to the central portion of the pipe. Similarly, the sealing material at the male end of the pipe is most effective if applied to that portion of the exterior surface of the male end which is innermost with respect to the central portion of the pipe, that is, that portion of the male end of the pipe most closely adjacent to the central portion of the pipe. The threads of male and female pipe ends so treated and interengaged are isolated from seepage either into or out of the pipe. The threads themselves are thereby not subject to adverse effects from fluids attempting to find a path of leakage. The major adverse effect to be prevented is a crushing of the male end of the pipe, either by freezing of a liquid in the space between interengaged threads or by a large pressure of a fluid between the interengaged threads as compared to the internal pressure within the pipe sections.

One particular application of the improved threaded filament wound pipe of this invention is as a coupling member between pipes. This is the embodiment in which the filament wound pipe has pipe threads which are internal threads at a first end of the pipe. The opening in the second end of the pipe narrows to form a collar, and there are two holes through the outer wall of the pipe at the collar, within the pipe wall to the collar or through the collar itself. This allows the threaded end of the pipe to be engaged about a mating threaded male end of an adjacent pipe. Another member having a diameter equal to the opening formed by the collar of the pipe is insertable into the second end of the pipe and is bonded therein when an adhesive is applied through one of the holes through the aforesaid pipe wall. This pipe embodiment may be used to join adjacent filament wound pipe sections, steel pipe sections, or pipe sections constructed of other materials. The two holes through the wall of the pipe may be spaced anywhere in the unthreaded portion of the pipe, but preferably the holes are radial and one is spaced near the collar and the other is near the adjacent part of the first or threaded portion of the pipe and is displaced 180° from the first hole.

The pipe in this embodiment is first threadably engaged upon a male end of another pipe member constructed of any material. The unthreaded end of another member, usually the cut end of another pipe section, is inserted into the annular opening formed by the collar until it reaches a stip, which is comprised of a thickness portion of the pipe wall and which separates the threaded from the unthreaded portion of the pipe. A plastic resin, such as epoxy or polyester resin, is then squeezed through one of the holes in the wall of the pipe. The resin fills the space bounded by the stop, the interior of the collar, the interior of the unthreaded portion of the pipe, and the exterior of the inserted unthreaded member. Air escapes through the second hole in the pipe wall, and the emergence of the adhesive through the second hole indicates that the space bounded by the interior of the pipe of this invention and the exterior of an inserted member, has been filled with adhesive. The adhesive is allowed to dry, thereby securely bonding the inserted member to an adjacent pipe section. The adjacent pipe section engaged in the interior threads of the pipe of this invention may be disengaged from the pipe of this invention, but the smooth walled member is firmly bonded to the pipe of this invention.

The preferred embodiments and the methods of manufacture of this invention are more clearly illustrated in the accompanying drawings.

FIG. 1 is a partial sectional view of a preferred embodiment of the pipe of this invention positioned upon a mandrel used in the pipe manufacture.

FIG. 2 is an isolated elevational view of the male end of the pipe of FIG. 1.

FIG. 3 is a half sectional view of an embodiment of the pipe of this invention used as a coupling member.

Referring now to FIG. 1, there is shown a threaded filament wound pipe 1 having a central portion 20 and two threaded pipe ends, male end 2 and female end 3. The pipe, as illustrated, is positioned upon a mandrel assembly 21. The mandrel assembly is comprised of a central smooth surfaced portion 9 into which end portions are force fitted. The male end portion of the mandrel is comprised of a form 10 which is force fitted into a central portion 9 of the mandrel. Around the male portion 10 is positioned a detachable annular ring 11, constructed of a thermoplastic or a plastic resin. Annular ring 11 comprises the other part of the male end portion and has a smooth inner surface, where it contacts form 10. The outer surface of annular ring 11 is covered with helical knurls 5 which are used to form the exterior threads 4 of the male end 2 of pipe 1.

At the other end of mandrel assembly 21 is a female end form 7. Female end form 7 is force fitted into the other end of central mandrel portion 9. From 7 is a member with helical knurls 6 located around its outer surface. These helical knurls 6 are used to form the interior threads 22 of the female end 3 of pipe 1. Both male end form 10 and female end form 7 have machine fastening holes 8 extending axially therein. These machine holes 8 accommodate fastening fingers protruding from a filament winding machine. The fingers are rotated, thereby turning the mandrel assembly 21 and allowing pipe 1 to be filament wound thereon. While end forms 7 and 10 and central portion 9 of mandrel assembly 21 have been depicted as solid members, it is equally possible to use hollow or partially hollow members as well.

The combination of angles used in filament winding pipe 1 are best illustrated in FIG. 2. In FIG. 2 the path of a single outer fiberglass filament 23 is illustrated over the extent of its path as it is helically wound from the extreme right towards the left at the male end 2 of pipe 1. It can be seen that filament 23, like all the filaments comprising the ends of the pipe of this invention, alternately deviates in radial disposition with respect to the pipe axis. That is, the filaments are at a smaller radius at the roots 25 of threads 4 than at crests 24 of threads 4. The filament winding angle of filament 23 is significantly smaller than the thread angle $\phi$. Since a smaller helical winding angle, with respect to the axis, results in a greater pitch between adjacent windings on the surface of the cylindrical pipe 1, the pitch of filament winding is greater than the pitch between adjacent threads 4 on male end 2 of pipe 1. In FIG. 2 the filament winding pitch is indicated as the distance W and the thread pitch between threads 2, is illustrated as the distance P.

As filament 23 crosses the crests 24 of threads 4, there is a tendency for it to stretch between crests 24 across the roots 25 of threads 4. The filament winding angle $\theta$, as illustrated, is great enough so that this bridging does not occur; however, it can be seen that if the filament winding angle $\theta$ becomes too small, filament 23 will tend to bridge between adjacent crests 24 across thread roots 25, the flanks of adjacent threads 4. In FIG. 2, the tangential component of the filament winding sufficiently alleviates the tendency towards bridging across the roots 25, and causes filament 23 to dip toward roots 25 and pass along the flanks of adjacent threads. Even if a slight amount of bridging does occur, excess resin from the filaments, such as filament 23, seeps into the roots 25 and thereby provides some support for the filaments. Very little of this bridging can be tolerated be-

March 23, 1971
G. A. EISERT
3,572,393
COLLAPSIBLE CORRUGATED TUBE
Filed Oct. 27, 1969
2 Sheets-Sheet 2
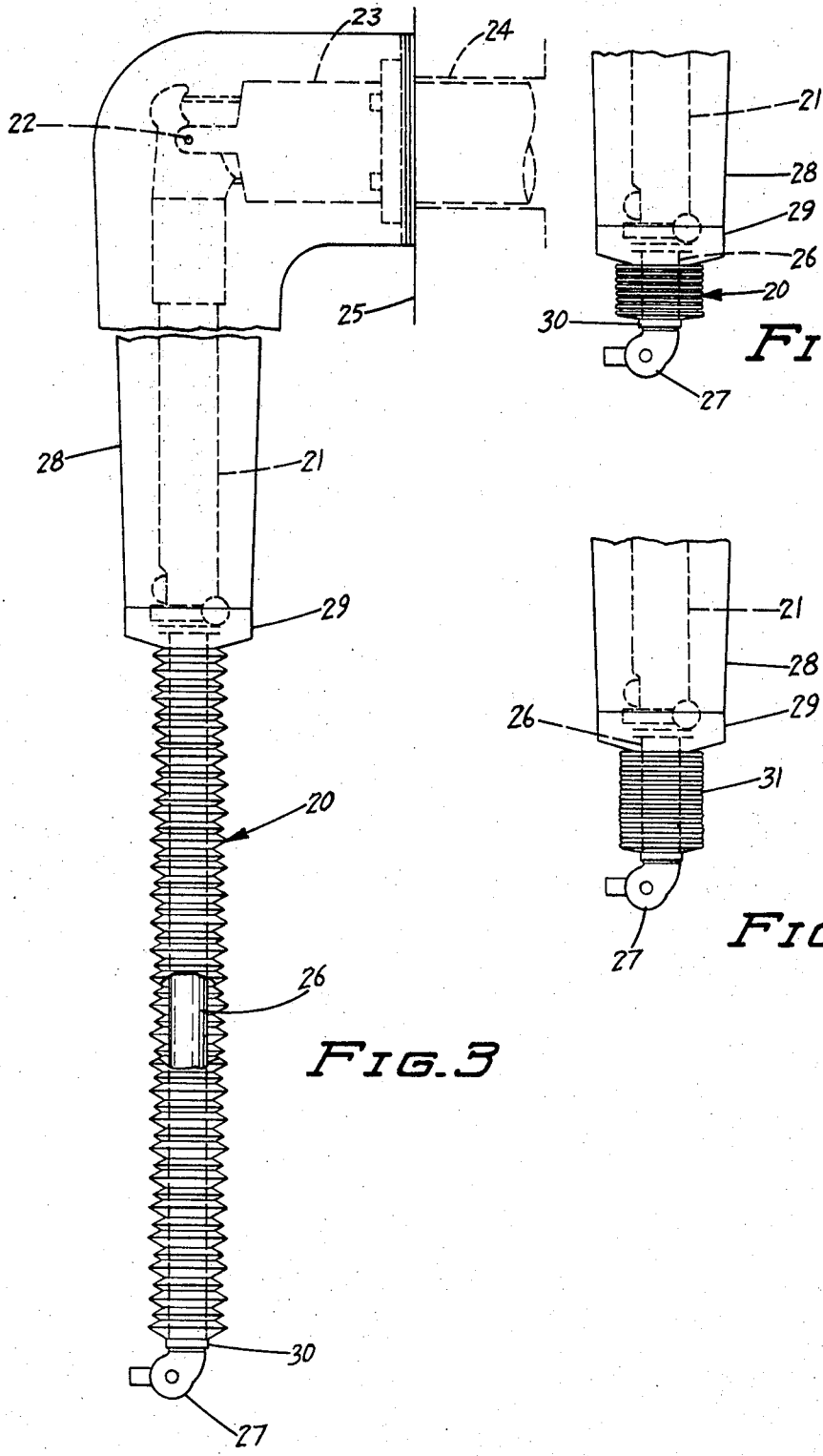
INVENTOR.
GERALD A. EISERT
BY
Burd, Braddock & Bartz
ATTORNEYS United States Patent Office 3,572,393
Patented Mar. 23, 1971

3,572,393
COLLAPSIBLE CORRUGATED TUBE
Gerald A. Eisert, Hastings, Minn., assignor to Central Research Laboratories, Inc., Red Wing, Minn.
Filed Oct. 27, 1969, Ser. No. 869,516
Int. Cl. F16l 11/00
U.S. Cl. 138—121               8 Claims

ABSTRACT OF THE DISCLOSURE

A collapsible and extensible corrugated cylindrical tube characterized by having alternating convolutions staggered so as to permit maximum collapsibility of the tube without materially reducing maximum extensibility of the tube. Alternating outer convolutions of lesser diameter nest between alternating outer convolutions of greater diameter when the tube is in collapsed state. Alternating inner convolutions of greater diameter nest between inner convolutions of lesser diameter when the tube is in collapsed state. The tube structure is particularly useful in collapsible boots for the slave arms of remote-control master-slave manipulators. By means of the collapsible structure, reduction in range of operation of the arm due to the boot can be materially lessened.

---

This invention relates to corrugated tube structure and more particularly to collapsible and extensible corrugated cylindrical tube structure in which the alternating inner and outer convolutions are staggered. Alternating convolutions are out of alignment with one another. This permits maximum collapsibility of the tube without materially reducing maximum extensibility of the tube. When the tube is in collapsed state, those outer convolutions of lesser diameter nest between and within the alternating outer convolutions of greater diameter. Similarly, the alternating inner convolutions of greater diameter nest between the inner convolutions of lesser diameter.

Conventional corrugated tubes, whether formed from metal or rubber or rubber-like synthetic resinous materials, ordinarily have inner convolutions of the same diameter and outer convolutions of greater diameter such that all of the inner convolutions are in substantial alignment and all of the outer convolutions are in substantial alignment. Because of practical problems of manufacture, the convolutions almost invariably have a visually observable radius of curvature where the walls of the corrugations come together. Total collapse of such tubes is not possible because of the slightly thickened annular bead-like formation at the peaks and valleys of the corrugations. Even in corrugated structures such as welded bellows formed from flat rings, the welded seams joining the flat walls of the corrugations form slightly thickened annular bead-like protuberances which prevent total collapse of the corrugated structure.

November U.S. Pat. No. 2,823,702, granted Feb. 18, 1958, shows a high pressure convoluted metal hose in which alternating outer corrugations are of greater and lesser diameter and all of the inner convolutions are of the same diameter. This is for the purpose of facilitating bending of the metal hose. However, because all of the inner convolutions are in alignment, they limit longitudinal compressibility of the hose. November U.S. Pat. No. 2,876,801, granted Mar. 10, 1959, similarly shows convoluted metal tubing in which alternating inner convolutions are of greater and lesser diameter while all of the outer convolutions are of the same diameter. This is likewise for the purpose of imparting greater flexibility to facilitate bending. Longitudinal compressibility is likewise limited by virtue of all of the outer convolutions being in longitudinal alignment.

It is common practice in the installation of remote control master-slave manipulators to encase the slave arm of the manipulator in a flexible sheath of protective material to limit or prevent transfer of contaminants from the slave cell through the barrier wall protecting the manipulator operator. The slave arm of such manipulators ordinarily includes a so-called trunk tube which may be moved laterally by rotation on a horizontal axis extending through the barrier wall, pivoted on an axis perpendicular to the axis of rotation but stationary so far as longitudinal movement is concerned.

Telescoped within the trunk tube is a so-called boom tube which moves laterally and pivots along with the trunk tube but is longitudinally extensible relative to the trunk tube. The trunk tube is ordinarily encased in a flexible sheath permitting ordinary movement of the trunk tube. The boom tube is ordinarily encased in a collapsible tubular boot secured at one end to the trunk tube or to the protective sheath for the trunk tube and at the other end to the wrist joint carried by the bottom end of the boom tube. Because of the relative longitudinal movement of the boom tube, the boot must be capable of easy extensibility and collapsibility so as not to interfere with operation of the slave arm. In order to avoid imposing excessive weight on the slave arm, the collapsible boot should be as lightweight as possible, consistent with needed protection. Accordingly, the boot should be as close fitting as possible consistent with full maneuverability of the slave arm.

Because the usable working space in the slave cell within which the slave arm is operable is determined in part by the length of longitudinal travel of the boom tube relative to the trunk tube, anything which limits the travel of the boom tube reduces the range of operation of the arm. Because of the limited compressibility of conventional corrugated boots, the longitudinal movement of the slave boom tube and the effective utility of the slave arm are sometimes reduced beyond tolerable limits. A collapsible boot having staggered convolutions according to the present invention materially lessens the reduction in longitudinal movement of the slave boom tube due to the boot and materially lessens the reduction in the range of operation of the slave arm due to the presence of the boot.

The invention is illustrated in the drawings in which corresponding parts are identified by the same numerals and in which:

FIG. 1 is an elevation, partly in section, of a segment of tube according to the present invention, shown in almost fully collapsed state;

FIG. 2 is an elevation, partly in section, showing a similar segment of tube in extended condition;

FIG. 3 is a schematic elevation showing a collapsible boot embodying the staggered corrugated tubular structure of the present invention in place of the slave arm of a remote control master-slave manipulator, the boom tube and boot being shown fully extended;

FIG. 4 is a fragmentary elevation showing the boot substantially fully collapsed; and FIG. 5 is a similar fragmentary elevation showing, for comparison, a substantially fully collapsed boot according to the prior art structure.

Referring now to the drawings and particularly to FIGS. 1 and 2, there is shown a segment of collapsible corrugated tube, indicated generally at 10, in both collapsed and extended condition. The tube is generally cylindrical, being generally circular in cross section. The tube 10 is composed of repeating identical segments, only one of which is described in detail. The tube includes outer convolutions 11 of maximum diameter alternating with outer convolutions 12 of slightly lesser diameter.

All of convolutions 11 are in longitudinal alignment with each other and all of convolutions 12 are in longitudinal alignment with each other.

Each outer convolution 11 is connected on one side by an annular segment of side wall 13 to an inner convolution 14 of least diameter and on the other side by annular wall 15 to an inner convolution 16 of slightly greater diameter. Outer convolution 12 is connected on one side to inner convolution 16 by means of annular side wall 17 and is connected on the other side to inner convolution 14 by annular side wall 18. Inner convolutions 14 and 16 alternate with one another. Inner convolutions 14 are in alignment with one another and inner convolutions 16 are in alignment with one another. Walls 13 are of greatest width. Walls 15 and 18 are of approximately equal width when the diameters of convolutions 11 and 12 differ from one another by approximately the same dimension as inner convolutions 14 and 16 differ from one another. Walls 17 are of least width. All of the walls are of substantially the same uniform thickness.

As seen in FIG. 1, when the tube is collapsed the adjacent pairs of walls 13–15, 15–17, 17–18 and 18–13 are prevented from coming into surface contact with one another across their entire widths because of the thicker structure at the peaks and valleys of the corrugations caused by the radius of curvature of each convolution. Total collapse of the tube is facilitated, however, by virtue of the staggered relation of the alternating outer convolutions 11 and 12 and inner convolutions 14 and 16. Each outer convolution 12 is of lesser diameter corresponding to the thickness of the bead-like ring of the peak of each corrugation. They nest between outer convolutions 11 of greater diameter and are spaced inwardly therefrom so as to permit the tube to be collapsed until the edges of adjacent outer convolutions 11 engage one another.

For greater clarity, the tube in FIG. 1 is shown in almost totally collapsed condition. It will be readily seen that slight additional longitudinal pressure applied to the tube will further compress the structure and close the slight gap existing between adjacent outer convolutions 11 but without bringing adjacent side walls into total face-to-face engagement. The slight annular bulbous structure created by the radius of curvature of each convolution never totally disappears. In the same manner, inner convolutions 16 are embraced by and nest within adjacent inner convolutions 14 of lesser diameter but are spaced inwardly therefrom so as to permit collapse of the inner perimeter of the tube in the same manner as the outside.

Corrugated tube of the staggered construction as described and illustrated may be formed from rubber or rubber-like synthetic resinous materials by any method suitable for the materials used. Such methods typically include dipping, spraying, electrodeposition, injection molding, and the like. The tubing may also be formed from metal as by electro-forming, hydro-forming or otherwise. The same concept of staggered convolutions is equally applicable to corrugated tubular structure formed from flat rings welded together, as in the case of welded bellows. For example, a welded bellows such as that described in Voitik U.S. Pat. No. 3,233,632, granted Feb. 8, 1966, can be made with staggered large radius annular welds providing reduced stress concentration and resulting improvement in fatigue life without excessive increase in collapsed length. This is done simply by staggering the inner and outer annular convolutions so that all of the inner convolutions are not in longitudinal alignment with one another and all of the outer convolutions are not in alignment with one another.

Although the corrugated tube is described and illustrated as being generally cylindrical with generally circular cross section, the same staggered convolution structure may be incorporated into tubes of other cross sectional shapes depending upon particular needs. For example, the tube may be oval in cross section, octagonal, hexagonal, square, or the like. In each instance, alternating folds, both inner and outer, are staggered as described and are in substantial longitudinal alignment with each other.

Referring now to FIG. 3, there is shown a collapsible non-permeable fluid tight protective boot 20 for the slave arm of a remote control master-slave manipulator incorporating the tube structure according to the present invention. The manipulator slave-arm comprises generally a trunk tube 21 pivotally connected at 22 to one end of a horizontal tubular support 23 which extends through an opening 24 in a barrier wall 25. The trunk tube 21 is rotatable with horizontal support 23 but is stationary relative to longitudinal movement. A boom tube 26 telescopes within trunk tube 21 and is longitudinally movable relative to the trunk tube. A wrist joint 27 at the bottom end of the boom tube carries some work performing means, such as tongs.

The upper portion of the slave arm including the trunk tube 21 and the portion of horizontal tubular support 23 extending into the slave cell is sheathed in a loose-fitting non-extensible protective boot 28 which has sufficient flexibility to permit the trunk tube to rotate on pivot 22 and move laterally by rotation with tubular support 23. The collapsible boot 20 is provided with an upper cuff 29 by means of which the collapsible boot 20 is adhesively secured or otherwise attached to the bottom end of boot 28. Collapsible boot 20 encases boom tube 26 and is attached at its lower end to the wrist joint by means of a band or strap 30 or other fastening means.

The wrist joint shown is of a type described in detail in copending U.S. Patent application Ser. No. 814,265 of Lester W. Haaker and Demetrius G. Jelatis, filed Apr. 8, 1969, entitled Sealed Wrist Joint. When some other forms of wrist joint are employed, the boot in some cases extends down to completely enclose the wrist joint. The boot 20 is selected so that its length in fully extended condition approximates the length of the boom tube 26. Since the objective is to minimize the length of the collapsed boot, the boot 20 is as long as necessary and no longer.

The beneficial effect of the use of a collapsible boot incorporating the tube structure of the present invention is readily seen by comparison of FIGS. 4 and 5. FIG. 4 shows the boot 20 in substantially fully collapsed condition. FIG. 5 shows a slave arm with a similar boot 31 according to the prior art having substantially the same number of corrugations but in which the convolutions are not staggered. The prior art boot occupies almost twice the length in its collapsed state as does the boot constructed according to the present invention. This difference represents a serious limitation upon the range of operation and overall utility of the manipulator.

By way of example, the boot 20 is desirably formed by spraying polyurethane resin uniformly on a mandrel having the form of the boot in fully extended condition. Polyurethane has good mechanical strength and resiliency along with abrasion resistance and resistance to radiation. The polyurethane structure is then oversprayed with "Hypalon," an elastomer made by substituting chlorine and sulfonyl chloride groups into polyethylene, which imparts good chemical resistance to the boot. The boot is cured on the mandrel sufficient to permit it to be stripped from the mandrel. It is then thoroughly powdered to prevent adjacent convolutions from sticking to one another, compressed and fully cured. In this manner, the boot assumes the normal at-rest collapsed condition but may be freely extended by the ordinary manipulative actions of the operator.

By way of further illustration, in a typical boot the corrugated portion is about 4½ inches outside diameter and each corrugation is about ½-inch deep. It has 45 corrugations and can be expanded to a maximum length of about 3 feet. When the corrugations are in-line, it may be collapsed to about 4¾ inches. When the corrugations are staggered, the number of corrugations being the same, the boot is capable of being extended to substantially the same length, but when collapsed the boot occupies only about 2½ inches.

Although the collapsible and extensible tube structure of the present invention finds particular utility in the manufacture of boots for remote control manipulators, its utility is by no means so limited. For example, the piston rods or hydraulic cylinders and similar telescopic and extensible mechanisms are commonly protected by collapsible and extensible tubular booting.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A collapsible and extensible corrugated tube comprising:
   (A) a continuous fluid tight tubular member,
   (B) a plurality of outer convolutions spaced longitudinally along the member and defining generally the outer perimeter of the member,
   (C) a plurality of inner convolutions spaced longitudinally along the member and defining generally the inner perimeter of the member,
   (D) said outer convolutions being staggered, the outer perimeter of alternating convolutions being greater than the outer perimeter of the adjacent outer convolutions spaced therebetween,
   (E) said inner convolutions being staggered, the inner perimeter of alternating convolutions being lesser than the inner perimeter of the adjacent inner convolutions spaced therebetween,
   (F) the outer convolutions having lesser perimeters nesting between the alternating outer convolutions of greater perimeters when the tubular member is collapsed longitudinally, and
   (G) the inner convolutions having greater perimeters nesting between the alternating inner convolutions of lesser perimeters when the tubular member is collapsed longitudinally.

2. A collapsible and extensible corrugated tube according to claim 1 further characterized in that:
   (A) said tubular member is generally cylindrical, and
   (B) said convolutions are generally circular.

3. A collapsible and extensible corrugated tube according to claim 1 further characterized in that said tubular member is formed in one piece from impervious flexible resilient rubber-like material.

4. A collapsible protective boot for extensible work-performing means extensible from relatively fixed support means, said boot comprising:
   (A) an elongated corrugated tube according to claim 1,
   (B) means at one end of said tube for attachment to the relatively fixed support, and
   (C) means at the opposite end of said tube for attachment to the extensible work performing means.

5. A collapsible boot according to claim 4 further characterized in that said tubular member is formed in one piece from impervious flexible resilient rubber-like material.

6. A collapsible boot according to claim 5 especially adapted for use with the slave arm of a remote-control master-slave manipulator and further characterized in that:
   (A) said tubular member is generally cylindrical,
   (B) said convolutions are generally circular, and
   (C) the extended length of said tubular member corresponds to the length of the boom tube of said slave arm.

7. A collapsible boot according to claim 6 further characterized in that the body of said tubular member is comprised predominantly of polyurethane.

8. A collapsible boot according to claim 7 further characterized in that said tubular member is provided with an over-layer of chlorinated and sulfonyl chlorinated polyethylene.

References Cited
UNITED STATES PATENTS

| | | | |
|---|---|---|---|
| 2,623,121 | 12/1952 | Loveridge | 138—121X |
| 2,823,702 | 2/1958 | November | 138—121 |
| 2,876,801 | 3/1959 | November | 138—121 |
| 3,234,969 | 2/1966 | Du Mont | 138—121 |
| 3,394,444 | 7/1968 | Moore et al. | 138—140X |

HERBERT F. ROSS, Primary Examiner